Patented Mar. 3, 1942

2,274,863

UNITED STATES PATENT OFFICE 2,274,863

SOLDERING ALLOY

Josef Leuser, Pforzheim, Germany

No Drawing. Application January 27, 1941, Serial No. 376,196. In Germany November 5, 1937

2 Claims. (Cl. 75—165)

The present invention relates to tarnish resistant soldering alloys which are of yellowish color and are particularly suitable for soldering yellow gold alloys.

This application is a continuation-in-part of my co-pending application Serial No. 238,064, filed October 31, 1938.

It is the object of the present invention to provide alloys which possess the necessary properties for soldering, for example, a low melting point, easy fusibility, resistance against tarnishing, capacity for rolling and compatibility with known fluxes.

In accordance with the present invention it has been found that the tarnish resistant, yellow alloys of the following composition possess excellent soldering properties:

|  | Per cent |
|---|---|
| Gold | 25–85 |
| Palladium | 2–20 |
| Copper | 5–30 |
| Cadmium | 3–25 |
| Silver | 0.5–20 |

Preferably the alloys are of the following composition:

|  | Per cent |
|---|---|
| Gold | 50–70 |
| Palladium | 5–10 |
| Copper | 10–25 |
| Cadmium | 3–25 |
| Silver | 5–10 |

Small quantities of other metals, either alone or in combination, may be added to influence the qualities of the solder in accordance with the present invention to a certain extent. The quantity of the added metals should, in general, however, not exceed about 5%, preferably 4%. The addition of small quantities of zinc, for example, about 0.1% to 2.5%, produces more dense castings, and the addition of small quantities of manganese, for example about 0.03% to 0.6% improves the rolling capacity of the soldering alloy. Addition of both metals in the proportions stated will improve the soldering alloy in both directions. Also it is possible to add small quantities of agents having a deoxidizing action to the alloy. Examples of suitable deoxidizing agents are as follows: titanium, silicon, magnesium and calcium boride.

The following are a number of examples of soldering alloys in accordance with the present invention:

Examples

|  | Pd | Au | Ag | Cu | Zn | Cd | Melting point interval |
|---|---|---|---|---|---|---|---|
|  |  |  |  |  |  |  | Degrees |
| 1 | 80 | 550 | 120 | 150 |  | 100 | 875–795 |
| 2 | 100 | 550 | 120 | 150 | 20 | 60 | 910–825 |
| 3 | 100 | 550 | 110 | 150 | 10 | 80 | 900–830 |
| 4 | 80 | 550 | 100 | 120 | 10 | 140 | 835–750 |
| 5 | 50 | 650 | 20 | 130 | 10 | 140 | 795–720 |
| 6 | 50 | 700 | 60 | 100 | 10 | 80 | 885–780 |
| 7 | 50 | 700 | 100 | 50 | 10 | 90 | 925–790 |
| 8 | 50 | 480 | 160 | 200 | 10 | 100 | 800–700 |
| 9 | 30 | 375 | 200 | 205 | 10 | 180 | 695–630 |

The soldering alloys in accordance with the present invention may be employed for many purposes and are especially suitable for soldering yellow-gold alloys as they are of yellowish color.

While I have described herein some embodiments of my invention, I wish it to be known that I do not intend to limit myself thereby, except within the scope of the appended claims.

I claim:

1. A soldering alloy highly resistant against tarnishing essentially comprising 25% to 85% of gold, 2% to 20% of palladium, 5% to 30% of copper, 3% to 25% of cadmium, 0.5% to 20% of silver, and 0.1% to 5% of zinc, said gold, palladium, copper, cadmium, silver and zinc constituting substantially all of the alloy.

2. A soldering alloy highly resistant against tarnishing essentially comprising 50% to 70% of gold, 5% to 10% of palladium, 10% to 25% of copper, 3% to 25% of cadmium, 0.5% to 10% of silver and 0.1% to 2.5% of zinc, said gold, palladium, copper, cadmium, silver and zinc constituting substantially all of the alloy.

JOSEF LEUSER.